United States Patent
Tanaka et al.

(10) Patent No.: US 7,099,763 B2
(45) Date of Patent: Aug. 29, 2006

(54) VEHICLE RAPID DECELERATION DETECTION DEVICE

(75) Inventors: Masami Tanaka, Fuji (JP); Nobuyori Nakajima, Fuji (JP)

(73) Assignee: Jatco LTD, (JP)

( * ) Notice: Subject to any disclaimer, the term of this patent is extended or adjusted under 35 U.S.C. 154(b) by 270 days.

(21) Appl. No.: 10/670,158

(22) Filed: Sep. 24, 2003

(65) Prior Publication Data

US 2004/0117097 A1 Jun. 17, 2004

(30) Foreign Application Priority Data

Sep. 24, 2002 (JP) ............................. 2002-277193

(51) Int. Cl.
*G06F 7/60* (2006.01)
*G06F 19/00* (2006.01)

(52) U.S. Cl. .......................... 701/70; 701/53; 192/3.31

(58) Field of Classification Search .................. 701/53, 701/70, 87; 192/3.31, 220.1
See application file for complete search history.

(56) References Cited

U.S. PATENT DOCUMENTS

| 4,738,492 | A | | 4/1988 | Matsuda ...................... 303/106 |
| 4,944,199 | A | | 7/1990 | Okino et al. .................... 74/858 |
| 5,315,536 | A | | 5/1994 | Murase et al. ............... 364/569 |
| 6,161,427 | A | * | 12/2000 | Watanabe et al. .......... 73/117.3 |
| 6,289,072 | B1 | | 9/2001 | Hubbard et al. .............. 377/20 |

FOREIGN PATENT DOCUMENTS

| EP | 0 341445 | A1 | 11/1989 |
| EP | 0 401757 | A2 | 12/1990 |
| EP | 0 495693 | A1 | 7/1992 |
| EP | 0 939252 | A2 | 9/1999 |
| JP | 4-315961 | | 11/1992 |

* cited by examiner

*Primary Examiner*—Thomas G. Black
*Assistant Examiner*—Christine M. Behncke
(74) *Attorney, Agent, or Firm*—Rossi, Kimms & McDowell, LLP (57) ABSTRACT

A vehicle speed memory unit stores a vehicle speed at a prior predetermined time, the vehicle speed being calculated from an interval of the vehicle speed pulse. A first rapid deceleration detecting section compares an elapsed time from a time the vehicle speed pulse signal is inputted, measured by an elapsed time measuring unit, with a pulse interval corresponding to a predetermined deceleration relative to a vehicle speed stored by the vehicle speed memory unit, or a second rapid deceleration detecting section calculates an undetermined vehicle speed from the elapsed time measured by the elapsed time measuring unit, and calculates a deceleration from the undetermined vehicle speed and the vehicle speed at the prior predetermined time, and compares the calculated deceleration with a predetermined deceleration threshold value. Thus, rapid vehicle deceleration can immediately be determined at the present time without waiting for the determination of the vehicle speed after input of the next pulse signal.

14 Claims, 6 Drawing Sheets

VEHICLE RAPID DECELERATION DETECTION DEVICE

BACKGROUND OF THE INVENTION

1. Field of the Invention

The present invention relates to a vehicle rapid deceleration detection device that detects rapid deceleration of a vehicle.

2. Description of the Prior Art

In the prior art, a device that detects rapid vehicle deceleration is disclosed for example in Japanese Laid-Open Patent Publication No. 11-247988. This device uses pulse signals outputted from a rotation sensor for detecting a vehicle speed. In the device, a pulse interval detected on a present occasion is compared with a pulse interval detected at a predetermined prior time, and it is determined that the vehicle is rapidly decelerating when the pulse interval detected on the present occasion is larger than the pulse interval at the predetermined prior time by a predetermined threshold value or more.

However, in the rapid deceleration detection device of the prior art using pulse interval, in the low vehicle speed region, the determination of pulse interval was delayed due to the extension of the pulse interval outputted from the rotation sensor, so the rapid deceleration determination was also delayed.

In particular, when the aforesaid rapid deceleration determination is used as a determining condition for engaging or disengaging the lockup clutch of an automatic transmission, the rapid deceleration determination is more delayed, the higher is the rapid deceleration, due to the extension of the pulse interval, so the lockup clutch could not be disengaged before vehicle stop or locking of wheel tires.

Also, if prevention of engine stalling is desired, it may be realized by setting the engaging region of the lockup clutch on the high side, but this will lead to a deterioration of fuel consumption.

SUMMARY OF THE INVENTION

In view of the above problems, it is an object of the present invention to provide a vehicle rapid deceleration detection device which can promptly determine the rapid deceleration of a vehicle.

To attain the above object, there is provided a vehicle rapid deceleration detection device comprising a rotation sensor which generates a vehicle speed pulse signal in synchronism with a vehicle speed, an elapsed time measuring unit which measures an elapsed time from a time the vehicle speed pulse signal is inputted, a vehicle speed calculating unit which calculates the vehicle speed from an interval of vehicle speed pulse signal, a vehicle speed memory unit which stores a determined vehicle speed at a prior predetermined time, a deceleration pulse interval calculating unit which calculates a pulse interval corresponding to a predetermined deceleration relative to the determined vehicle speed stored in the vehicle speed memory unit, and a rapid deceleration determining unit which determines rapid deceleration of the vehicle, wherein the rapid deceleration determining unit compares the elapsed time measured by the elapsed time measuring unit with the pulse interval calculated by the deceleration pulse interval calculating unit, and determines that the vehicle has rapidly decelerated when the elapsed time is longer than the pulse interval calculated by the deceleration pulse interval calculating unit.

According to this invention, rapid deceleration of a vehicle is determined by comparing an elapsed time measured by an elapsed time measuring unit, and a pulse interval calculated by a deceleration pulse interval calculating unit, so rapid deceleration of the vehicle can be determined even at a time a pulse signal is not inputted yet and therefore the pulse interval is not determined. Thus, even in the low vehicle speed region when the pulse interval from the rotation sensor is longer, there is no need to wait for input of the next pulse signal to determine the vehicle speed, and rapid deceleration of the vehicle can be determined while awaiting input of the next pulse signal.

The above and other objects, features, and advantages of the invention will become more apparent from the following detailed description taken in conjunction with the accompanying drawings.

D TAILED DESCRIPTION OF THE PREFERRED EMBODIM NTS

The present invention will now be described in detail with reference to the drawings showing a preferred embodiment thereof.

Figure 1:
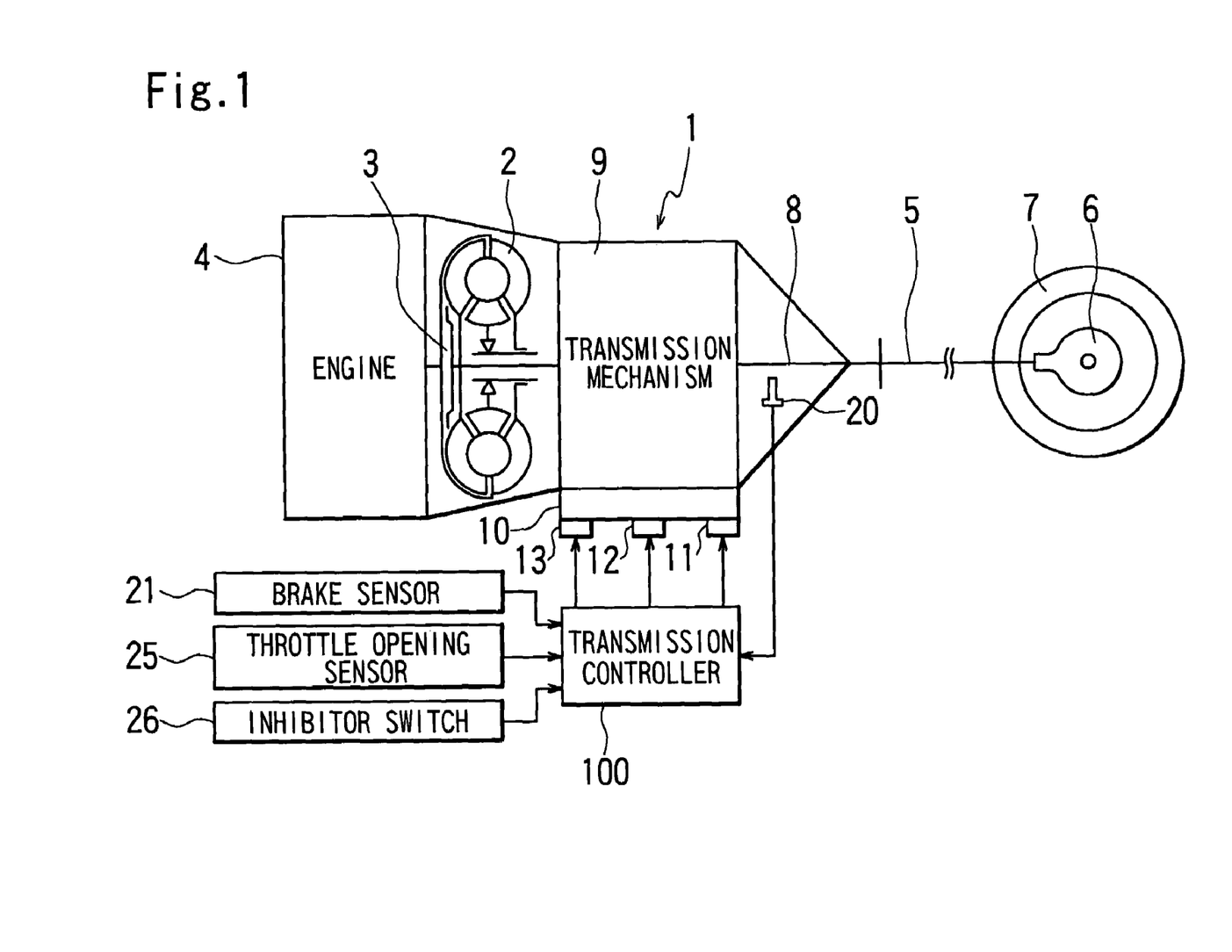
FIG. 1 is a diagram showing an embodiment of the present invention.

FIG. 1 is a schematic view showing a construction of a lockup clutch control system of an automatic transmission for a vehicle according to the present invention.

An automatic transmission 1 comprising a torque converter 2 is connected to an engine 4, and an output shaft 8 of the automatic transmission 1 is connected to a propeller shaft 5. The drive force outputted from the engine 4 is inputted to a transmission mechanism 9 of the automatic transmission 1 via the torque converter 2 provided with a lockup clutch 3. In the transmission mechanism 9, rotation speed conversion of the input drive force is performed, and the speed-converted drive force is transmitted from the output shaft 8 to a drive wheel 7 via the propeller shaft 5 and a differential 6.

The automatic transmission 1 comprises a control valve 10 provided with shift solenoids 11, 12 and a lockup solenoid 13 as a drive unit, the solenoids 11, 12, 13 being controlled by a transmission controller 100.

A brake ON/OFF signal from a brake sensor 21, a throttle valve opening signal from a throttle opening sensor 25, a range signal from an inhibitor switch 26, and pulse signal from a rotation sensor which generates pulse signal in synchronism with the rotation of the output shaft 8, are inputted to the transmission controller 100.

The transmission controller 100 calculates an optimum gear position for the present vehicle running condition using the inputted throttle valve opening signal and the range signal, and performs gear shifting of the automatic transmission 1 by switching the shift solenoids 11, 12 ON and OFF so that the calculated gear position is obtained.

Further, the transmission controller 100 checks whether or not the present vehicle running condition is in a lockup region where the torque increase function and torque fluctuation absorption function are not required to the torque converter 2. By performing duty control of the lockup solenoid 13 of the control valve 10, the transmission controller 100 makes the torque converter in a lockup state in which the lockup clutch 3 of the torque converter 2 is engaged in the lockup region, and the transmission controller 100 makes the torque converter in a non-lockup state in which the lockup clutch 3 is disengaged in other regions. In particular, when the vehicle is rapidly decelerating, the lockup clutch 3 is rapidly disengaged, and thus engine stall is prevented.

Figure 2:
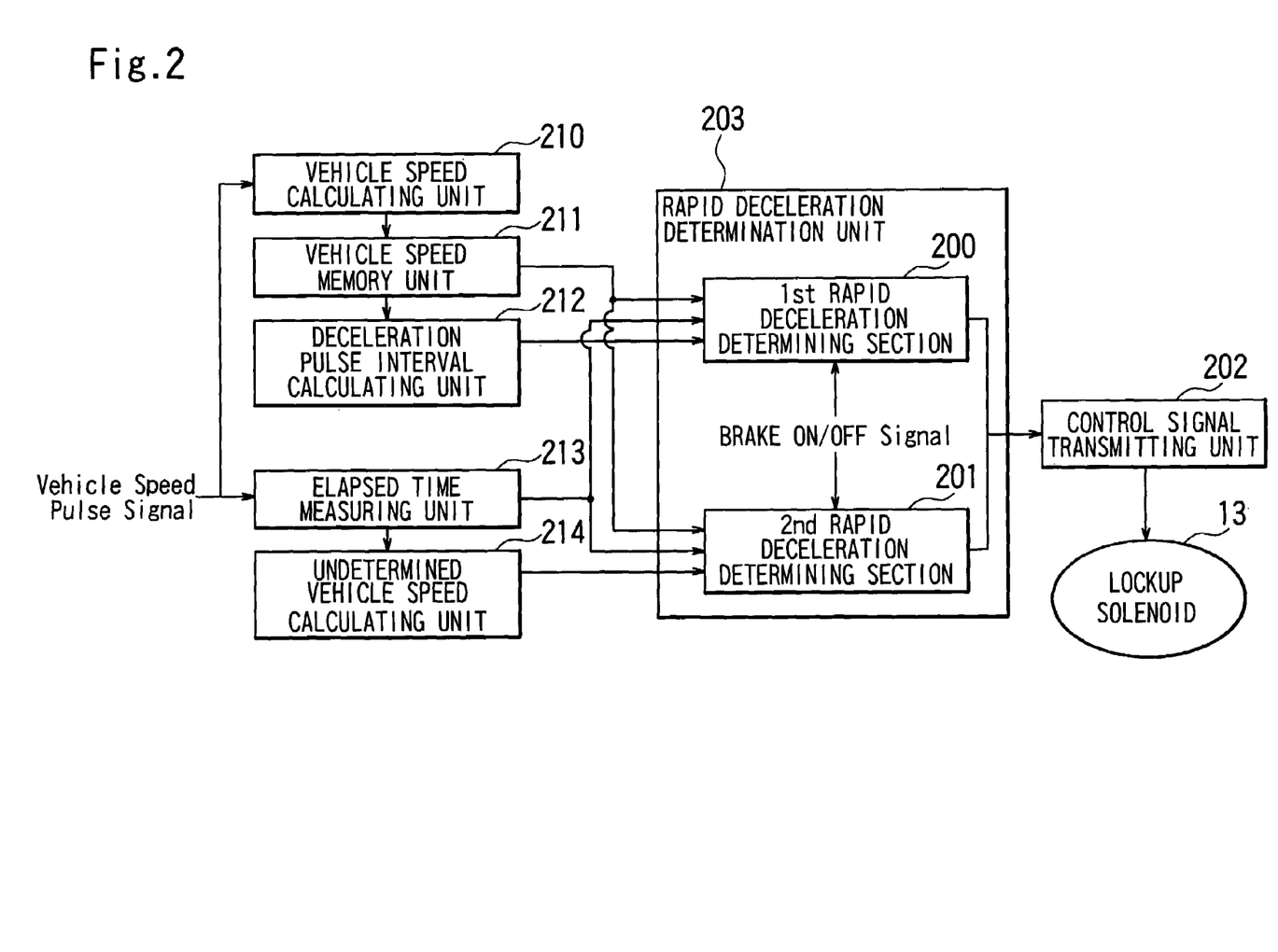
FIG. 2 is a control block diagram in rapid deceleration determination.

A description will now be given of a control by the transmission controller, for determining of the vehicle rapid deceleration, and disengaging of the lockup clutch, with reference to a flow chart of FIG. 2.

In the transmission controller 100, a pulse signal from a rotation sensor 20 is inputted to a vehicle speed calculating unit 210 and elapsed time measuring unit 213. In the elapsed time measuring unit 213, a 1-pulse interval measurement elapsed time is measured based on the inputted pulse signal. This 1-pulse interval measurement elapsed time denotes the elapsed time from when the elapsed time measuring unit 213 received a pulse signal outputted by the rotation sensor 20 on the immediately preceding occasion to the present time when the next pulse signal has not been received. The elapsed time measuring unit 213 measures the 1-pulse interval measurement elapsed time, and outputs it to an undetermined vehicle speed calculating unit 214, and to a first rapid deceleration detecting section 200 and a second rapid deceleration detecting section 201 of a rapid deceleration determination unit 203.

In the undetermined vehicle speed calculating unit 214, assuming that there was a pulse signal input at the present time, the vehicle speed (hereafter, undetermined vehicle speed) is calculated based on the elapsed time measured by the elapsed time measuring unit 213, and the calculated undetermined vehicle speed is outputted to the second rapid deceleration detecting section 201.

At the same time, in the vehicle speed calculating unit 210, the vehicle speed is calculated from the pulse interval of the inputted pulse signal, and the vehicle speed memory unit 211 stores the calculated vehicle speed, and the pulse interval used for calculating the vehicle speed. The vehicle speed memory unit 211 outputs the vehicle speed and the pulse interval to a deceleration pulse interval calculating unit 212, and to the first rapid deceleration detecting section 200 and second rapid deceleration detecting section 201 in the rapid deceleration determination unit 203. In the deceleration pulse interval calculating unit 212, the vehicle speed pulse interval corresponding to a predetermined deceleration is calculated relative to the vehicle speed stored in the vehicle speed memory unit 211.

Figure 3:
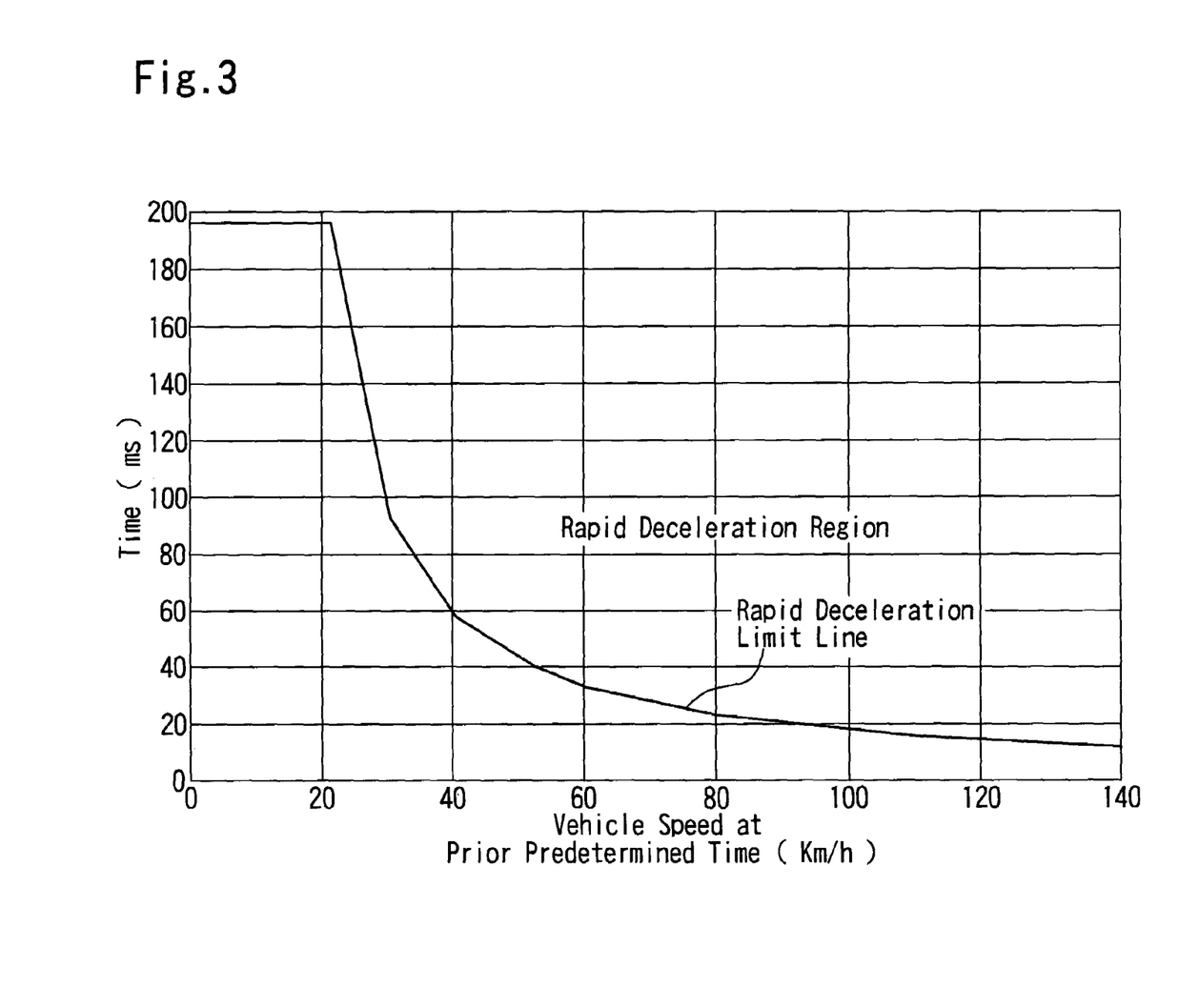
FIG. 3 is a map showing a rapid deceleration boundary line for performing rapid deceleration determination.

The vehicle speed pulse interval corresponding to this predetermined deceleration may be represented as a rapid deceleration limit line as shown in FIG. 3. The figure is a map having time and vehicle speed at prior predetermined time as axes. The rapid deceleration limit line is drawn on a map by plotting vehicle speed pulse intervals corresponding to the predetermined deceleration, calculated for each vehicle speed at the prior predetermined time. The rapid deceleration limit line has a lower value, the larger is the vehicle speed at the prior predetermined time. The region above the rapid deceleration limit line in FIG. 3 is taken to be the rapid deceleration region.

A brake ON/OFF signal from the brake sensor 21 is inputted to the first rapid deceleration detecting section 200 and second rapid deceleration detecting section 201. Here, ON signal indicates that the brake is in operation, and OFF signal indicates that the brake is in un-operation.

The first rapid deceleration detecting section 200 and second rapid deceleration detecting section 201 in the rapid deceleration determination unit 203 detect rapid vehicle deceleration by mutually parallel but dissimilar ways based on input information. Also, when at least one of the first rapid deceleration detecting section 200 and second rapid deceleration detecting section 201 detects rapid vehicle deceleration, the rapid deceleration determining unit 203 determines that the vehicle has rapidly decelerated, and outputs the determination result to a control signal transmitting unit 202.

The control signal transmitting unit 202 outputs a control signal commanding disengagement of the lockup clutch 3 to the lockup solenoid 13 of the control valve 10 when it received a vehicle rapid deceleration determining signal from the rapid deceleration determination unit 203. As a result, the lockup solenoid 13 is driven so as to disengage the lockup clutch 3.

Figure 4:
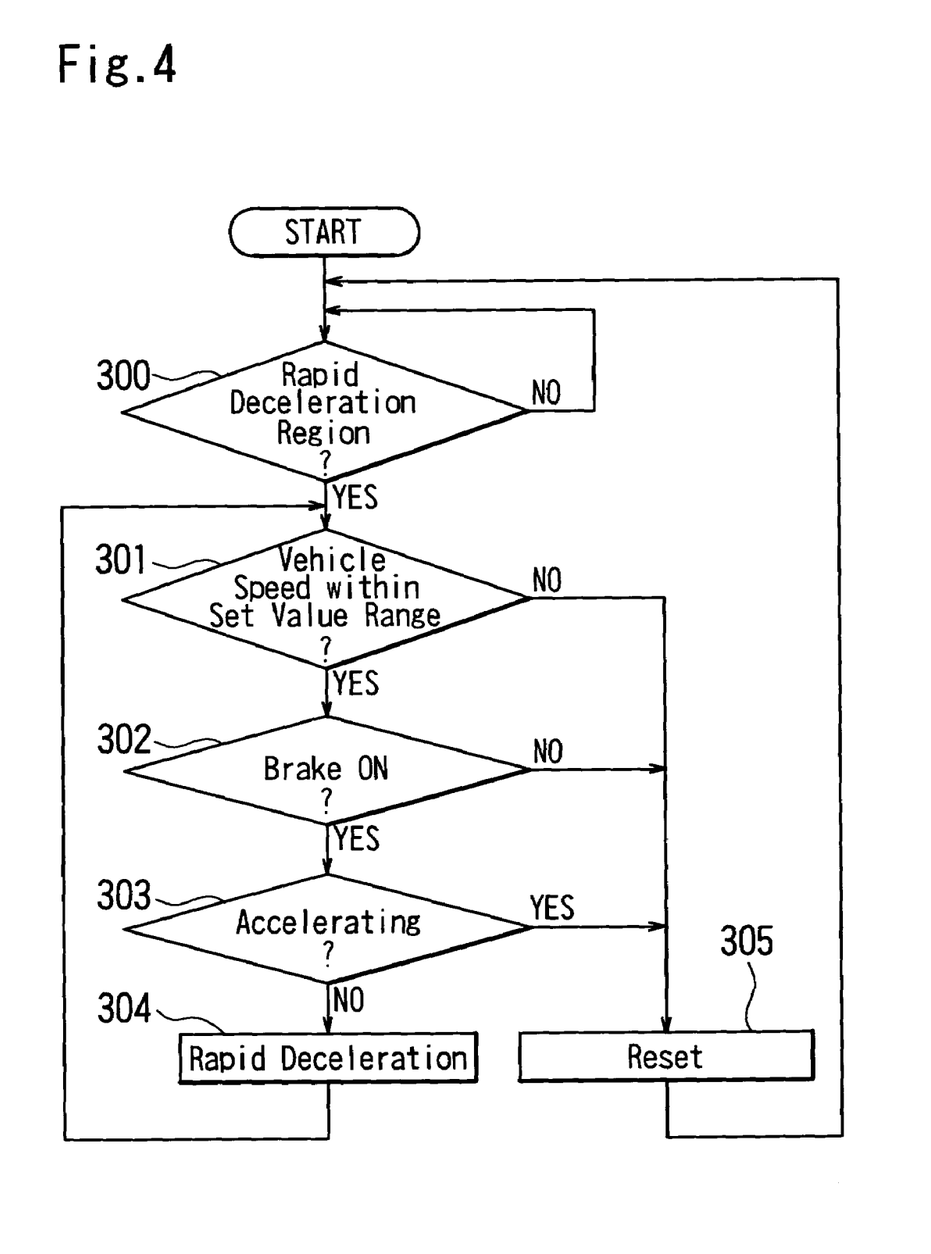
FIG. 4 is a flow chart showing a vehicle rapid deceleration determination in a first rapid deceleration detecting unit.

Next, referring to the flow chart of FIG. 4, the vehicle rapid deceleration detecting sequence performed in the first rapid deceleration detecting section 200 will be described.

In a step 300, the vehicle speed pulse interval corresponding to a predetermined deceleration relative to the vehicle speed at the prior predetermined time and the present 1-pulse interval measurement elapsed time (QtPRD) are compared, and it is determined whether or not the vehicle may be rapidly decelerating. Specifically, this determination determines that the vehicle may be rapidly decelerating, when the intersection point between the vehicle speed at the prior predetermined time and the present 1-pulse interval measurement elapsed time on the map shown in FIG. 3 lies within a rapid deceleration region defined by a preset rapid deceleration limit line as boundary line.

When the intersection point between the vehicle speed at the prior predetermined time and the 1-pulse interval measurement elapsed time lies within the rapid deceleration region, it is assumed that rapid deceleration is possible, and the routine proceeds to a step 301. On the other hand, when the intersection point does not lie within the rapid deceleration region, the processing of the step 300 is repeated.

In the step 301, it is determined whether or not the vehicle speed stored in the vehicle speed memory unit 211 lies within a set value range for disengaging the lockup clutch 3. When the vehicle speed lies within the set value range, the routine proceeds to a step 302, and when it does not lie within the set value range, the routine proceeds to a step 305. In the step 305, all processing is reset, then the routine returns to the step 300 and the processing is repeated.

In the step 302, when the brake ON/OFF signal from the brake sensor 21 is ON, the routine proceeds to a step 303.

On the other hand, when the brake is OFF, since the vehicle does not rapidly decelerate any further, so the routine proceeds to the step 305 to reset the processing and the routine returns to the step 300.

In the step 303, it is determined whether or not the vehicle is accelerating based on the vehicle speed stored in the vehicle speed memory unit 211. When the vehicle is not accelerating, the routine proceeds to a step 304. On the other hand, when it is accelerating, the routine proceeds to the step 305.

In the step 304, it is determined that the vehicle has rapidly decelerated. After determining the rapid deceleration, the routine returns to the step 301 and the processing is repeated.

Hence, in the map shown in FIG. 3, when the intersection point between the vehicle speed at the prior predetermined time and the 1-pulse interval measurement elapsed time lies within the rapid deceleration region defined by the rapid deceleration limit line as boundary line, the vehicle speed lies within a set vehicle speed region in which the lockup should be released (disengaged), the brake is ON and the vehicle is not accelerating, it is determined that the vehicle has rapidly decelerated.

Figure 5:
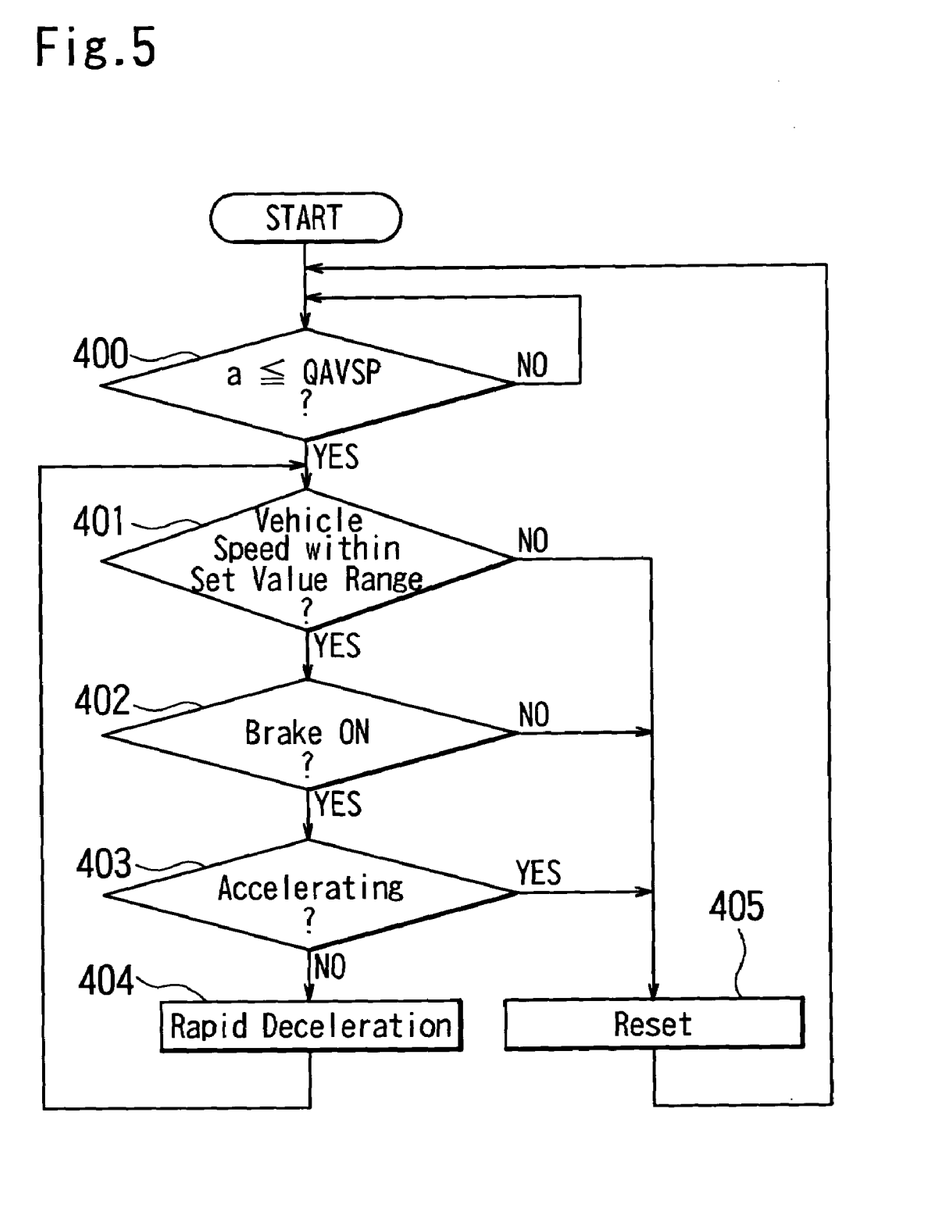
FIG. 5 is a flow chart showing a vehicle rapid deceleration determination in a second rapid deceleration detecting unit.

Next, referring to the flow chart of FIG. 5, the vehicle rapid deceleration detection sequence performed by the second rapid deceleration detection section 201 will be described.

In a step 400, a deceleration "a" representing the slope of the vehicle speed change is calculated using the equation (1) shown below, based on information such as the inputted vehicle speed, and so forth, and compared with a preset, predetermined deceleration threshold value (QAVSP) to determine whether or not the vehicle may be rapidly decelerating.

$$a = (QVsp1 - QVsp1NF)/((QtPRD + Toutrev)/2) \quad (1)$$

Figure 6:
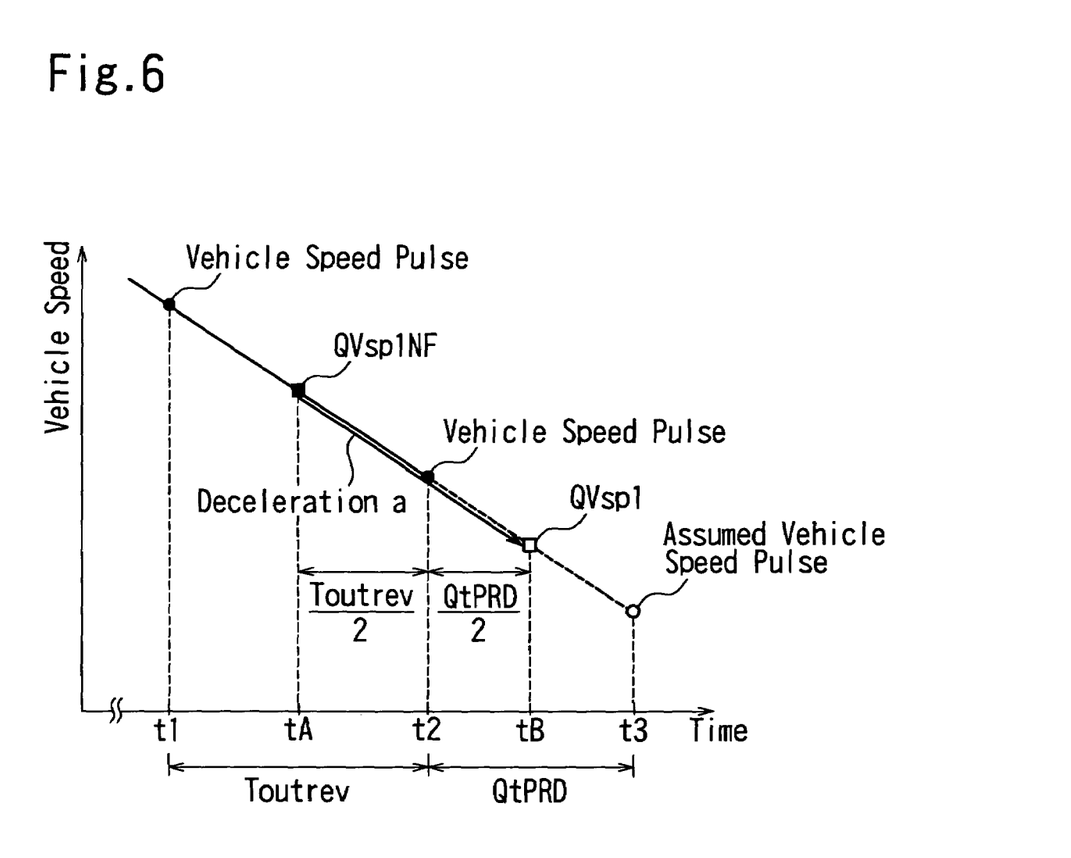
FIG. 6 is a diagram showing a vehicle deceleration.

Herein, as shown in FIG. 6, it is assumed the present time be t3, the time when the immediately preceding vehicle speed pulse was received be t2, and the time when the vehicle speed pulse two preceding occasions ago was received be t1. The time width from the time t2 to t3 represents 1-pulse interval measurement elapsed time (QtPRD), and the time width from the time t1 to t2 represents a present determined pulse interval (Toutrev). QVsp1NF is the vehicle speed calculated based on the vehicle speed pulse received at the time t2. This vehicle speed QVsp1NF is the average vehicle speed between the times t1, t2 calculated from the time width between the times t1 and t2, and the value QVsp1NF is taken at a time tA which is the center point between the times t1, t2.

Further, assuming that a vehicle speed pulse was received at the present time t3 at which a vehicle speed pulse has not been actually received, the vehicle speed calculated based on this assumed vehicle speed pulse is the undetermined vehicle speed QVsp1. Likewise, as in the case of the vehicle speed QVsp1NF, the value of the undetermined vehicle speed QVsp1 is taken at a time tB at the center point between the times t2 and t3.

Therefore, the deceleration "a" calculated from equation (1) represents the slope of the vehicle speed change from the time tA to tB as shown in FIG. 6. When this deceleration "a" is equal to or less than a predetermined deceleration threshold value QAVSP (absolute value increases in a negative direction), i.e., when the slope of the vehicle speed change represented by the deceleration "a" is a sharper slope in the speed decreasing direction than the slope of the speed change represented by the predetermined deceleration threshold value, it is determined that the vehicle may be rapidly decelerating, and the routine proceeds to a step 401. On the other hand, when the deceleration "a" is larger than the predetermined deceleration threshold value QAVSP, the processing of the step 400 is repeated.

From the step 401 to the step 405, the processing is identical to the processing from the aforesaid step 301 to the step 305, and its description is therefore omitted.

In the second rapid deceleration detecting section 201, the deceleration "a" is calculated from the equation (1) using the undetermined vehicle speed QVsp1 obtained assuming that the vehicle speed pulse was received at the present time t3 when a vehicle speed pulse was not received, and the vehicle speed QVsp1NF which is already determined. When this deceleration "a" is equal to or less than the predetermined deceleration threshold value QAVSP, the vehicle speed is within the set vehicle speed range in which the lockup should be released, the brake is ON and the vehicle is also not accelerating, it is determined that the vehicle has rapidly decelerated.

According to the above described embodiment, the first rapid deceleration detecting section 200 compares the elapsed time measured by the elapsed time measuring unit 213 with the pulse interval corresponding to the predetermined deceleration relative to the vehicle speed stored by the vehicle speed memory unit 211, or the second rapid deceleration detecting section 201 calculates the undetermined vehicle speed from the elapsed time measured by the elapsed time measuring unit 213, calculates the deceleration from the undetermined vehicle speed and the vehicle speed at a prior predetermined time, and compares it with a predetermined deceleration threshold value. Thus, rapid vehicle deceleration can immediately be determined at the present time without waiting for the determination of the vehicle speed after input of the next pulse signal.

In this way, even in the low vehicle speed region when the pulse interval from the rotation sensor 20 is longer, rapid vehicle deceleration can promptly be determined without waiting for the next pulse signal input.

Since the first rapid deceleration detecting section 200 and second rapid deceleration detecting section 201 simultaneously perform processing for detecting rapid vehicle deceleration in different way each other, so rapid vehicle deceleration can be determined more quickly. As rapid deceleration can be promptly determined in this way, the lockup solenoid 13 as a drive unit can be promptly commanded to disengage the lockup clutch 3, thus engine stall due to the delay in disengaging the lockup clutch can be prevented.

Further, by performing rapid deceleration determination when the vehicle speed is within the set value range and the brake is ON, an incorrect rapid deceleration determination is avoided in a condition where rapid deceleration determination is unnecessary.

Although in the first rapid deceleration detecting section 200 the vehicle speed pulse interval corresponding to a predetermined deceleration relative to the vehicle speed at a predetermined prior time is compared with the present 1-pulse interval measurement elapsed time to determine whether or not the vehicle may be rapidly decelerating, but instead of the pulse interval, the vehicle speed corresponding to a predetermined deceleration relative to the vehicle speed at a predetermined prior time, may be compared with an undetermined vehicle speed obtained from the present 1-pulse interval measurement elapsed time, to determine that the vehicle is rapidly decelerating if a difference between the compared vehicle speeds is equal to or greater than a predetermined threshold value.

Although in the second rapid deceleration detecting section 201 in the aforesaid embodiment, equation (1) is used to calculate the deceleration "a" representing the slope of the vehicle speed change, but the invention is not limited thereto. As a further modification, a deceleration "a'" may be calculated using the following equation (2) instead of equation (1), and a comparison made with a preset predetermined threshold value (QAVSP').

$$a' = (QVsp1 - QVsp1NF)/(QtPRD + Toutrev) \qquad (2)$$

Hence, using equation (2), a difference between the vehicle speed QVsp1NF calculated based on the vehicle speed pulse received at the time t2 shown in FIG. 6 and the vehicle speed QVsp1 calculated based on the elapsed time from when the vehicle speed pulse was received at the time t2 to the present time when a vehicle speed pulse has not been received, is divided by a time width obtained by adding the present determined pulse interval (Toutrev) to the 1-pulse interval measurement elapsed time (QtPRD). Then, by comparing the deceleration "a'" calculated from equation (2) and the preset, predetermined threshold value (QAVSP'), rapid vehicle deceleration can be determined.

What is claimed is:

1. A vehicle rapid deceleration detection device, comprising:
    a rotation sensor which generates a vehicle speed pulse signal in synchronism with a vehicle speed;
    an elapsed time measuring unit which measures an elapsed time from a time the vehicle speed pulse signal is input;
    a vehicle speed calculating unit which calculates the vehicle speed from the interval of said vehicle speed pulse signal;
    a vehicle speed memory unit which stores a determined vehicle speed at a prior predetermined time;
    a deceleration pulse interval calculating unit which calculates a pulse interval corresponding to a predetermined deceleration relative to the determined vehicle speed at the prior predetermined time stored by said vehicle speed memory unit; and
    a rapid deceleration determining unit which determines rapid deceleration of the vehicle;
    wherein said rapid deceleration determining unit compares the elapsed time measured by said elapsed time measuring unit with the pulse interval calculated by said deceleration pulse interval calculating unit, and when the elapsed time is longer than the pulse interval, determines that the vehicle has rapidly decelerated.

2. A vehicle rapid deceleration detection device, comprising:
    a rotation sensor which generates a vehicle speed pulse signal in synchronism with a vehicle speed;
    an elapsed time measuring unit which measures an elapsed time from a time the vehicle speed pulse signal is input;
    an undetermined vehicle speed calculating unit which calculates an undetermined vehicle speed from the elapsed time from the time the vehicle speed pulse signal is input, measured by said elapsed time measuring unit, to the present time;
    a vehicle speed calculating unit which calculates the vehicle speed from the interval of the vehicle speed pulse signal;
    a vehicle speed memory unit which stores the present determined vehicle speed; and
    a rapid deceleration determining unit which determines rapid deceleration of the vehicle;
    wherein said rapid deceleration determining unit, using the present determined vehicle speed stored by said vehicle speed storage unit, the undetermined vehicle speed calculated by said undetermined vehicle speed calculating unit, the elapsed time measured by said elapsed time measuring unit, and the present determined pulse interval based on which said present determined vehicle speed is calculated, calculates a deceleration representing the slope of a vehicle speed change by dividing the difference between the undetermined vehicle speed and present determined vehicle speed, by a time width calculated based on the present determined pulse interval and said elapsed time, and determines that the vehicle has rapidly decelerated when the calculated deceleration has reached a predetermined threshold value.

3. A vehicle rapid deceleration detection device, comprising:
    a rotation sensor which generates a vehicle speed pulse signal in synchronism with a vehicle speed;
    an elapsed time measuring unit which measures an elapsed time from a time the vehicle speed pulse signal is input;
    a vehicle speed calculating unit which calculates the vehicle speed from the interval of the vehicle speed pulse signal;
    a vehicle speed memory unit which stores a determined vehicle speed at a prior predetermined time and the present determined vehicle speed;
    a deceleration pulse interval calculating unit which calculates a pulse interval corresponding to a predetermined deceleration relative to the determined vehicle speed at the prior predetermined time stored by said vehicle speed memory unit;
    an undetermined vehicle speed calculating unit which calculates an undetermined vehicle speed from the elapsed time from the time the vehicle speed pulse signal is input, measured by said elapsed time measuring unit, to the present time; and
    a rapid deceleration determining unit which determines rapid deceleration of the vehicle;
    wherein said rapid deceleration determining unit includes:
    a first rapid deceleration detecting section which compares the elapsed time measured by said elapsed time measuring unit with the pulse interval calculated by said deceleration pulse interval calculating unit, and determines rapid deceleration of the vehicle when the elapsed time is larger than the pulse interval; and
    a second rapid deceleration detecting section which, using the present determined vehicle speed stored by said vehicle speed memory unit, the undetermined vehicle speed calculated by said undetermined vehicle speed calculating unit, the elapsed time measured by said elapsed time measuring unit, and the present determined pulse interval based on which said present determined vehicle speed is calculated, calculates a deceleration representing the slope of a vehicle speed change by dividing the difference between the undetermined vehicle speed and present determined vehicle speed, by a time width calculated using the present determined pulse interval and said elapsed time, and determines rapid deceleration of the vehicle when the calculated deceleration has reached a predetermined threshold value; and
    wherein the rapid deceleration determining unit determines that the vehicle has rapidly decelerated, when at least one of said first rapid deceleration detecting section and second rapid deceleration detecting section determines rapid deceleration of the vehicle.

4. The vehicle rapid deceleration detecting device according to claims 1, 2 or 3, comprising:

a control signal transmitting unit which transmits a control signal to a drive unit of said vehicle:
   wherein said control signal transmitting unit transmits a control signal to said drive unit when rapid deceleration of the vehicle is determined by said rapid deceleration determining unit.

5. The vehicle rapid deceleration detecting device according to claim 4, wherein:
   said drive unit is a drive circuit which controls engaging or disengaging of a lockup clutch provided to an automatic transmission, and
   said control signal transmitting unit transmits a control signal to said drive circuit to disengage the lockup clutch engaged, when rapid deceleration of the vehicle is determined by said rapid deceleration determining unit.

6. The vehicle rapid deceleration detecting device according to claim 5, wherein:
   said rapid deceleration determining unit determines the rapid deceleration of the vehicle when said calculated vehicle speed is within a predetermined set value range.

7. The vehicle rapid deceleration detecting device according to claim 6, comprising:
   a brake sensor which detects ON/OFF of a vehicle brake;
   wherein said rapid deceleration determining unit determines the rapid deceleration of the vehicle when ON of the vehicle brake is detected by said brake sensor.

8. The vehicle rapid deceleration detecting device according to claim 5, comprising:
   a brake sensor which detects ON/OFF of a vehicle brake;
   wherein said rapid deceleration determining unit determines the rapid deceleration of the vehicle when ON of the vehicle brake is detected by said brake sensor.

9. The vehicle rapid deceleration detecting device according to claim 4, wherein:
   said rapid deceleration determining unit determines the rapid deceleration of the vehicle when said calculated vehicle speed is within a predetermined set value range.

10. The vehicle rapid deceleration detecting device according to claim 9, comprising:
   a brake sensor which detects ON/OFF of a vehicle brake;
   wherein said rapid deceleration determining unit determines the rapid deceleration of the vehicle when ON of the vehicle brake is detected by said brake sensor.

11. The vehicle rapid deceleration detecting device according to claim 4, comprising:
   a brake sensor which detects ON/OFF of a vehicle brake;
   wherein said rapid deceleration determining unit determines the rapid deceleration of the vehicle when ON of the vehicle brake is detected by said brake sensor.

12. The vehicle rapid deceleration detecting device according to claim 1, 2, or 3, wherein: said rapid deceleration determining unit determines the rapid deceleration of the vehicle when said calculated vehicle speed is within a predetermined set value range.

13. The vehicle rapid deceleration detecting device according to claim 12, comprising:
   a brake sensor which detects ON/OFF of a vehicle brake;
   wherein said rapid deceleration determining unit determines the rapid deceleration of the vehicle when ON of the vehicle brake is detected by said brake sensor.

14. The vehicle rapid deceleration detecting device according to claim 1, 2, or 3, comprising:
   a brake sensor which detects ON/OFF of a vehicle brake;
   wherein said rapid deceleration determining unit determines the rapid deceleration of the vehicle when ON of the vehicle brake is detected by said brake sensor.

* * * * *

UNITED STATES PATENT AND TRADEMARK OFFICE
CERTIFICATE OF CORRECTION

| | |
|---|---|
| PATENT NO. | : 7,099,763 B2 |
| APPLICATION NO. | : 10/670158 |
| DATED | : August 29, 2006 |
| INVENTOR(S) | : Masami Tanaka et al. |

It is certified that error appears in the above-identified patent and that said Letters Patent is hereby corrected as shown below:

On Title Page
Item (73) Assignee: the following Assignee was typed incorrectly and should be as the following:
--JATCO Ltd--

Signed and Sealed this

Fourteenth Day of November, 2006

JON W. DUDAS
*Director of the United States Patent and Trademark Office*